United States Patent
Matsutani

(10) Patent No.: US 9,690,287 B2
(45) Date of Patent: Jun. 27, 2017

(54) SERVO SYSTEM AND ENCODER

(71) Applicant: KABUSHIKI KAISHA YASKAWA DENKI, Kitakyushu-shi (JP)

(72) Inventor: Yasuhiro Matsutani, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/142,179

(22) Filed: Apr. 29, 2016

(65) Prior Publication Data
US 2016/0246289 A1    Aug. 25, 2016

Related U.S. Application Data

(63) Continuation of application No. PCT/JP2013/079942, filed on Nov. 5, 2013.

(51) Int. Cl.
*H02K 29/10* (2006.01)
*G05B 19/416* (2006.01)
(Continued)

(52) U.S. Cl.
CPC ........... *G05B 19/416* (2013.01); *G01D 5/305* (2013.01); *G01D 5/341* (2013.01); *H02K 11/22* (2016.01);
(Continued)

(58) Field of Classification Search
USPC ....................................... 318/404.4, 603, 72
See application file for complete search history.

(56) References Cited

U.S. PATENT DOCUMENTS 6,809,489 B1 * 10/2004 Yoshida ................. B41J 19/202
318/560
6,956,505 B2 * 10/2005 Taniguchi ........... H03M 1/1038
341/11
(Continued)

FOREIGN PATENT DOCUMENTS

CN        102428641 A     4/2012
JP        2007-194826 A   8/2007
(Continued)

OTHER PUBLICATIONS

International Search Report issued Dec. 17, 2013 in PCT/JP2013/079942 filed Nov. 5, 2013 (with English Translation).
(Continued)

*Primary Examiner* — Jorge L Carrasquillo
(74) *Attorney, Agent, or Firm* — Oblon, McClelland, Maier & Neustadt, L.L.P.

(57) ABSTRACT

A servo system includes a motor having a stator and a movable element which moves relative to the stator, an encoder which detects at least one of a position and a speed of the movable element of the motor, and a controller including first circuitry which controls operation of the motor based on a detection result of the encoder. The first circuitry of the controller transmits a first command signal that changes a communication speed between the encoder and the controller from a first speed to a second speed which is higher than the first speed, and the encoder includes second circuitry which changes the communication speed between the encoder and the controller to the second speed when the first command signal is received from the controller.

18 Claims, 7 Drawing Sheets

(51) Int. Cl.
*H02K 11/22* (2016.01)
*G01D 5/30* (2006.01)
*G01D 5/34* (2006.01)
*H02P 6/16* (2016.01)

(52) U.S. Cl.
CPC ...... *G05B 2219/33218* (2013.01); *H02P 6/16* (2013.01)

(56) References Cited

U.S. PATENT DOCUMENTS

| | | | | |
|---|---|---|---|---|
| 8,912,928 | B2* | 12/2014 | Murokita | G01D 5/2449 341/1 |
| 2012/0049779 | A1* | 3/2012 | Kawajiri | G05B 9/02 318/611 |
| 2012/0205527 | A1 | 8/2012 | Yoshida et al. | |
| 2012/0226397 | A1* | 9/2012 | Sopko | B60L 3/003 701/22 |
| 2012/0326642 | A1 | 12/2012 | Miura et al. | |

FOREIGN PATENT DOCUMENTS

| | | |
|---|---|---|
| JP | 4816988 B1 | 11/2011 |
| JP | 2013-110904 A | 6/2013 |
| JP | 2013110904 A * | 6/2013 |
| WO | WO 2010/131361 A1 | 11/2010 |

OTHER PUBLICATIONS

Written Opinion issued Dec. 17, 2013 in PCT/JP2013/079942 filed Nov. 5, 2013.
Search Report and Written Opinion issued Mar. 8, 2016 in Singaporean Patent Application No. 11201508722X, filed Nov. 5, 2013.
International Preliminary Report on Patentability and Written Opinion of the International Searching Authority issued May 10, 2016 in PCT/JP2013/079942 filed Nov. 5, 2013 (English translation only).
Office Action issued May 4, 2017, in Chinese Patent Application No. 201380080451, filed Nov. 5, 2013 (with English-language Translation).

* cited by examiner

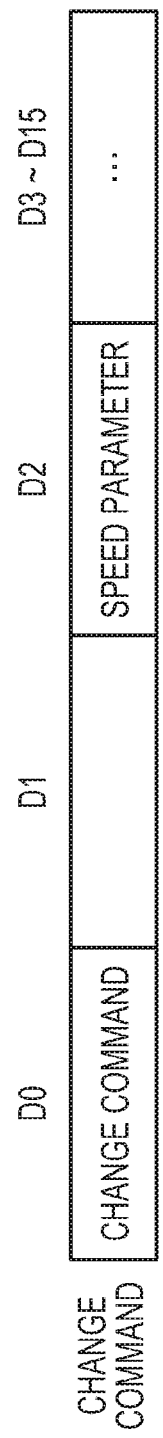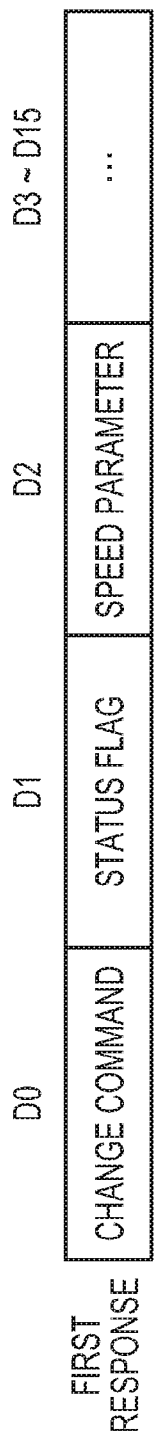

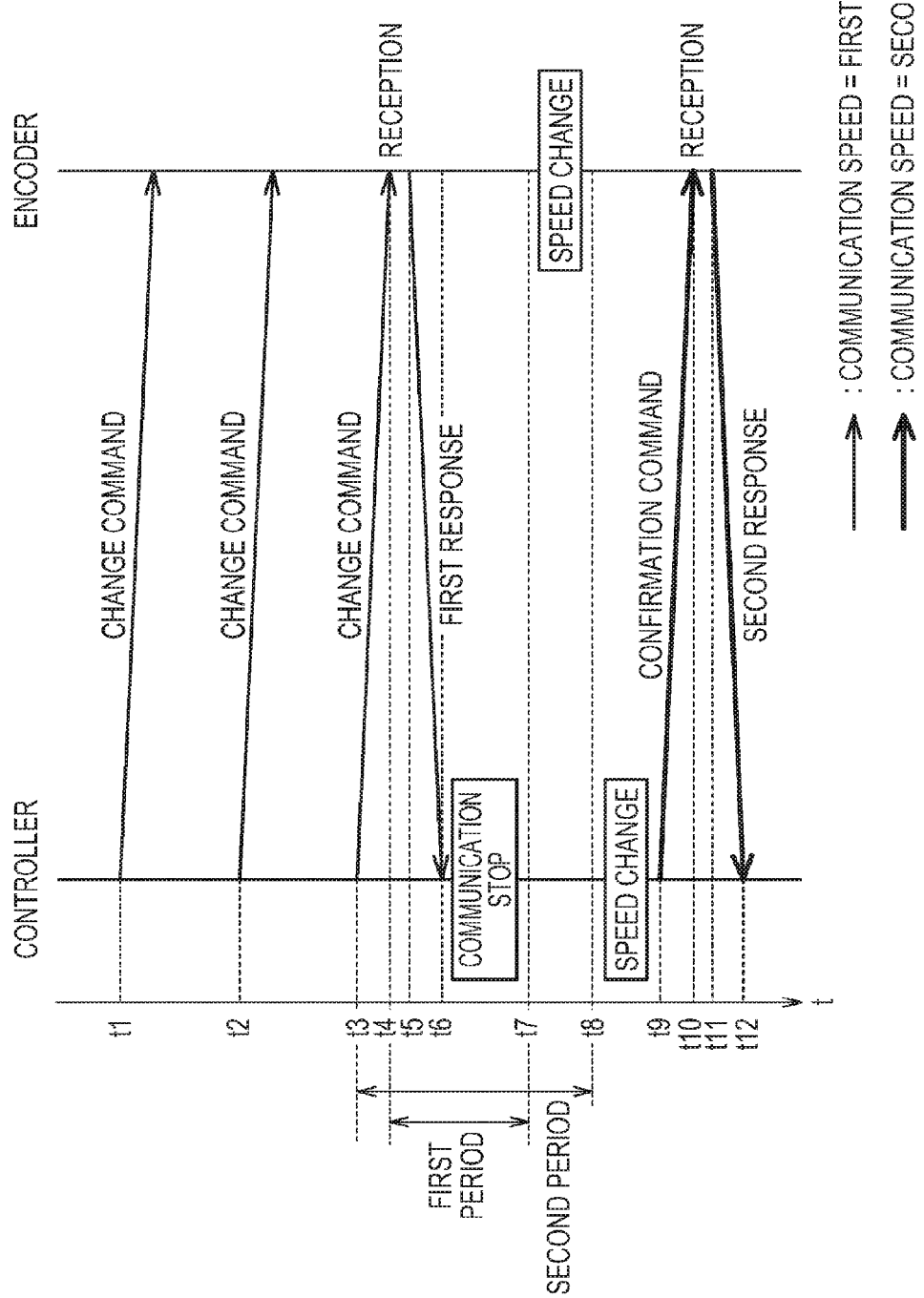

SERVO SYSTEM AND ENCODER

CROSS-REFERENCE TO RELATED APPLICATIONS

The present application is continuation of and claims the benefit of priority to International Application No. PCT/JP2013/079942, filed Nov. 5, 2013, the entire contents of which are incorporated herein by reference.

BACKGROUND OF THE INVENTION

Field of the Invention

An embodiment of this disclosure relates to a servo system and an encoder.

Description of Background Art

Japanese Patent No. 4816988 describes a servo system including a servo motor, and a controller which acquires position data from an encoder and controls the rotation of the servo motor based on the position data. The entire contents of this publication are incorporated herein by reference.

SUMMARY OF THE INVENTION

According to one aspect of the present invention, a servo system includes a motor having a stator and a movable element which moves relative to the stator, an encoder which detects at least one of a position and a speed of the movable element of the motor, and a controller including first circuitry which controls operation of the motor based on a detection result of the encoder. The first circuitry of the controller transmits a first command signal that changes a communication speed between the encoder and the controller from a first speed to a second speed which is higher than the first speed, and the encoder includes second circuitry which changes the communication speed between the encoder and the controller to the second speed when the first command signal is received from the controller.

According to another aspect of the present invention, an encoder device for a servo system includes first circuitry which changes a communication speed from a first speed to a second speed between the first circuitry and a controller which controls operation of a motor based on a detection result of the first circuitry, when a first command signal is received from the controller. The controller includes second circuitry which transmits the first command signal that changes the communication speed between the first circuitry and the controller from the first speed to the second speed which is higher than the first speed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4A is an explanatory view for describing one example of data structure of a change command;

FIG. 4B is an explanatory view for describing one example of data structure of a first response;

FIG. 5 is an explanatory view for describing one example of communication between the controller and the encoder;

DETAILED DESCRIPTION OF THE EMBODIMENTS

Figure 1:
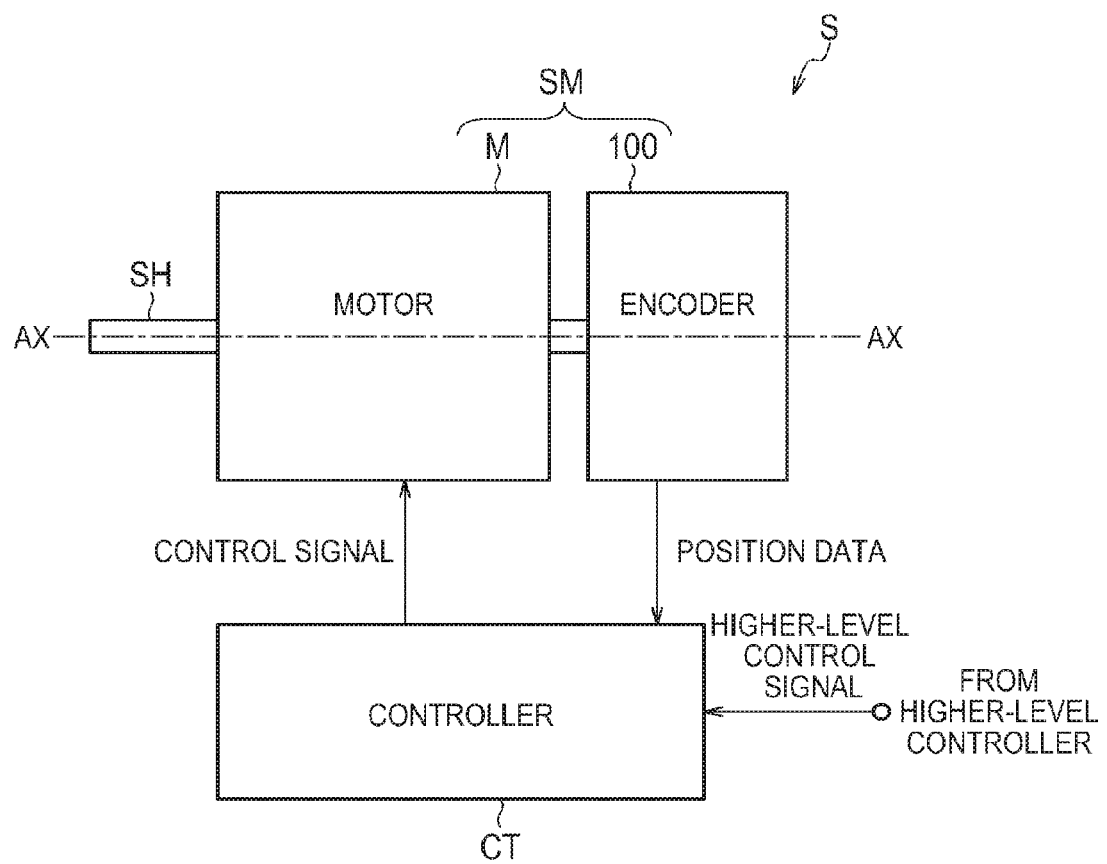
FIG. 1 is an explanatory view for describing the schematic configuration of a servo system according to one embodiment.

The embodiments will now be described with reference to the accompanying drawings, wherein like reference numerals designate corresponding or identical elements throughout the various drawings.

A servo system according to one embodiment described hereinafter is applicable to various types of servo systems including a rotary type servo system and a linear type servo system. However, to facilitate the understanding of the servo system, the description is made by taking a rotary type servo system as an example, hereinafter. An embodiment of the present invention is applicable to other types of servo systems by applying an appropriate modification such as a change in motor from a rotary-type motor to a linear-type motor or a change in object to be measured from a rotary-type disc to a linear-type linear scale. Accordingly, the detailed description of other types of servo systems is omitted.

Servo System

First, the schematic configuration of a servo system according to this embodiment is described with reference to FIG. 1.

As shown in FIG. 1, a servo system (S) includes a servo motor (SM) and a controller (CT). The servo motor (SM) includes a motor (M) and an encoder 100.

The motor (M) is one example of a power generation source not including the encoder 100. The motor (M) is a rotary-type motor including a rotor and a stator (neither shown in the drawing) and in which the rotor rotates relative to the stator. The motor (M) outputs a rotational force by rotating a shaft (SH) which is fixed to the rotor about an axis (AX). The rotation is one example of the movement, and the rotor corresponds to one example of a movable element.

Although there may be a case where the motor (M) in the form of a single unit is referred to as a servo motor, in this embodiment, the motor which includes the encoder 100 is referred to as the servo motor (SM).

The motor (M) is not particularly limited provided that the motor (M) is a motor where the encoder 100 can detect the position of the rotor or the like. The motor (M) is not limited to an electric motor which uses electricity as a power source, and the motor (M) may be a motor which uses other power sources such as a hydraulic motor, a pneumatic motor, or a steam motor, for example. Here, for the sake of convenience of the description, the description is made with respect to the case where the motor (M) is an electric motor hereinafter.

The encoder 100 is connected to the shaft (SH) on a side (also referred to as "an opposite-to-load side") opposite to a rotational force output side (also referred to as "a load side"). A connecting position of the encoder 100 is not limited to the side opposite to the rotational force output side of the shaft (SH), and may be the rotational force output side of the shaft (SH). The encoder 100 detects the position (also referred to as "a rotation angle") of the rotor by detecting the position of the shaft (SH), and outputs position data indicating the position of the rotor.

The encoder 100 is not particularly limited provided that the encoder 100 is an encoder which can detect the position and the like of the rotor. As the encoder 100, a magnetic encoder, an optical encoder, an encoder which adopts both a magnetic method and an optical method (so-called hybrid-type encoder) can be used. Here, for the sake of convenience of the description, the description is made with respect to a case where the encoder 100 is an optical encoder. The optical encoder is roughly classified into a reflection-type encoder and a transmission-type encoder. In this embodiment, it does not matter whether the encoder 100 is a reflection-type encoder or a transmission-type encoder.

That is, the encoder 100 includes: a light source; a disc which is connected to the rotor; a light receiving element and the like (none of these components shown in the drawing). In the encoder 100, the light receiving element receives light which is irradiated from the light source and is subjected to action of a slit formed in the disc (light which is reflected on the slit or light which passes through the slit) and generates a detection signal, the position of the rotor which the detection signal indicates is detected based on the detection signal of the light receiving element, and position data indicating the position of the rotor is outputted.

The encoder 100 may be structured to detect at least one of a speed (also referred to as "rotational speed", "an angular velocity" or the like) and an acceleration (also referred to as "rotational acceleration", "angular acceleration" or the like) of the rotor in addition to or in place of the position of the rotor. In this case, the speed and the acceleration of the rotor can be detected by applying first-order or second-order differentiation to the position with time or by performing processing such as counting detection signals from the light receiving element for a predetermined time, for example. Here, for the sake of convenience of the description, the description is made with respect to the case where a physical quantity detected by the encoder 100 is the position.

The controller (CT) acquires position data from the encoder 100, and controls the operation of the motor (M) based on the position data. That is, the controller (CT) corresponds to one example of a higher-level device. Accordingly, in this embodiment where an electric motor is used as the motor (M), the controller (CT) controls an operation of the motor (M) by controlling an electric current, a voltage or the like applied to the motor (M) based on the position data. Further, the controller (CT) may be structured to acquire a higher-level control signal from a higher-level controller (not shown in the drawing), and to control an operation of the motor (M) such that a rotational force which enables the positioning of the rotor to the position indicated by the higher-level control signal or the like is outputted from the shaft (SH). When the motor (M) is a motor using other power source such as a hydraulic pressure, a pneumatic pressure, steam or the like, the controller (CT) can control an operation of the motor (M) by controlling the supply of such a power source.

Functional Configuration of Controller and Encoder

Figure 2:
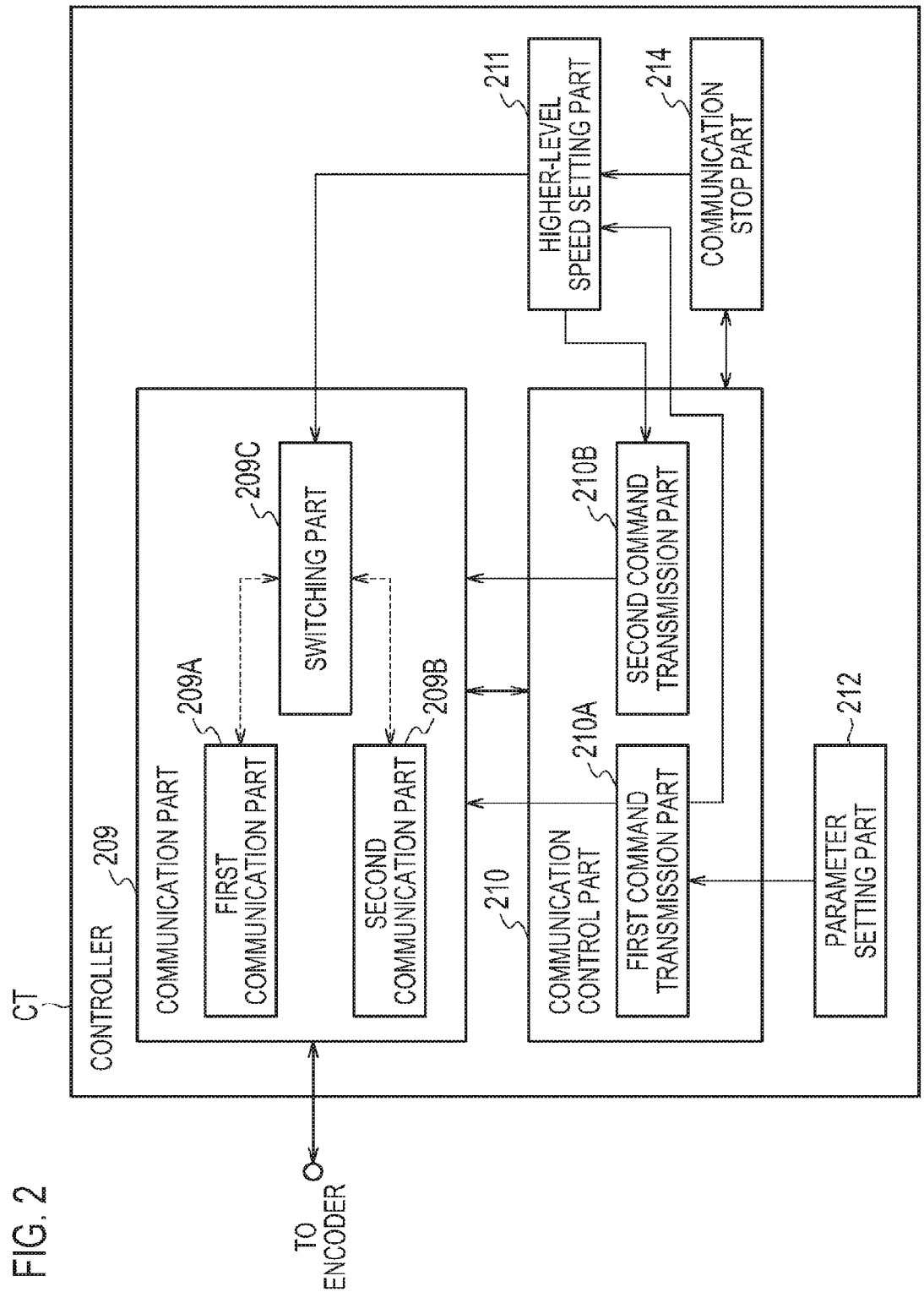
FIG. 2 is an explanatory view for describing a functional configuration of a controller.
Figure 3:
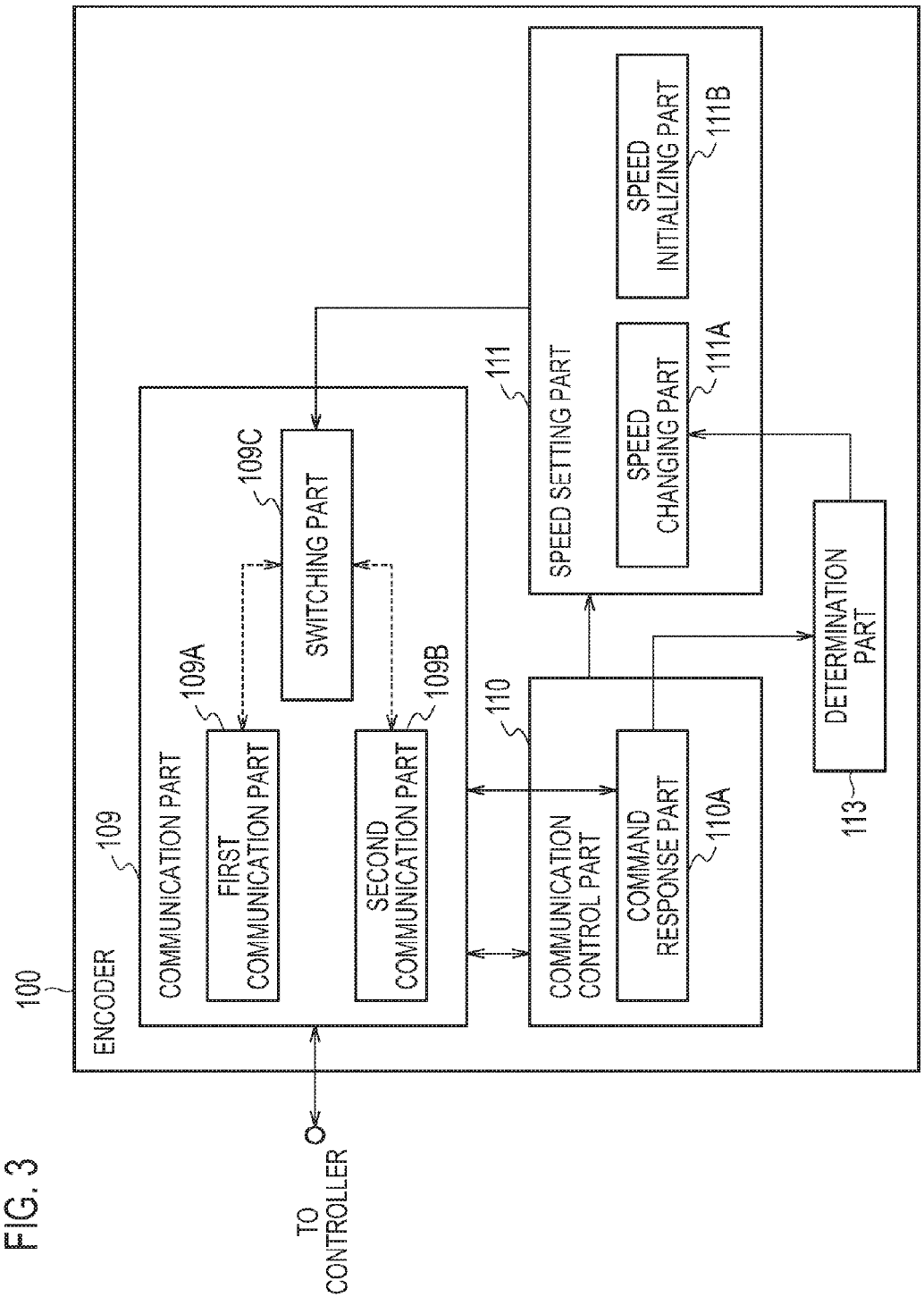
FIG. 3 is an explanatory view for describing a functional configuration of an encoder.

Next, the functional configurations of parts of the controller (CT) and the encoder 100 relating to a function of changing a communication speed are described with reference to FIG. 2 and FIG. 3. In FIG. 2 and FIG. 3, the illustration of parts of the controller (CT) relating to a function of controlling an operation of the motor (M), parts of the encoder 100 relating to a function of generating position data and the like is omitted.

As shown in FIG. 2 and FIG. 3, the controller (CT) and the encoder 100 are connected to each other in a mutually communicable manner via a wired transmission line or a radio transmission line. The controller (CT) includes: a communication part 209; a parameter setting part 212; a communication control part 210; a communication stop part 214; and a higher-level speed setting part 211. The encoder 100 includes: a communication part 109; a communication control part 110; a determination part 113; and a speed setting part 111.

The communication part 209 of the controller (CT) performs the communication with the encoder 100. To be more specific, the communication part 209 performs the acquisition of a signal outputted from the communication control part 210, the transmission of the signal to the encoder 100, the reception of a signal transmitted from the encoder 100, and the outputting of the signal to the communication control part 210.

In this embodiment, the communication part 209 can perform the communication with the encoder 100 at predetermined speeds. That is, the communication part 209 can set its communication speed with the encoder 100 (hereinafter, also referred to as "controller-side communication speed") at predetermined speeds. Values and the number of the controller-side communication speeds which the communication part 209 can set are not particularly limited. However, for the sake of convenience of the description, hereinafter, the description is made with respect to the case where the number of controller-side communication speeds which the communication device 209 can set is two.

That is, the communication part 209 can perform the communication with the encoder 100 at two speeds, that is, a speed (V1) (for example, 4 Mbps) and a speed (V2) (for example, 8 Mbps) higher than the speed (V1). That is, the communication part 209 can set the controller-side communication speed at two speeds, that is, the speed (V1) and the speed (V2). The controller-side communication speed may be initially set to any one of the speed (V1) and the speed (V2). However, for the sake of convenience of the description, hereinafter, the description is made with respect to the case where the controller-side communication speed is initially set at the speed (V1).

The communication part 209 includes: a first communication part (209A); a second communication part (209B); and a switching part (209C). The first communication part (209A) performs the communication with the encoder 100 at the above-mentioned speed (V1) based on a predetermined communication protocol. The second communication part (209B) performs the communication with the encoder 100 at the above-mentioned speed (V2) based on a predetermined communication protocol. The switching part (209C) switches a communication part for performing the communication with the encoder 100 between the first communication part (209A) and the second communication part (209B) based on a higher-level switching signal described later acquired from the higher-level speed setting part 211 described later.

The communication part 109 of the encoder 100 performs the communication with the controller (CT). To be more specific, the communication part 109 performs the acquisition of a signal outputted from the communication control part 110, the transmission of the signal to the controller (CT), the reception of a signal transmitted from controller (CT), and the outputting of the signal to the communication control part 110.

In this embodiment, the communication part 109 can perform the communication with the controller (CT) at predetermined speeds. That is, the communication part 109 can set its communication speed with the controller (CT) (hereinafter, also referred to as "an encoder-side communication speed") at the predetermined speeds. Values and the number of the encoder-side communication speeds which the communication part 109 can set are not particularly limited. However, for the sake of convenience of the description, hereinafter, the description is made with respect to the case where the number of encoder-side communication speeds which the communication device 109 can set is two.

The communication part 109 includes: a first communication part (109A); a second communication part (109B); and a switching part (109C). The first communication part (109A) performs the communication with the controller (CT) at the above-mentioned speed (V1) based on a predetermined communication protocol. The second communication part (109B) performs the communication with the controller (CT) at the above-mentioned speed (V2) based on a predetermined communication protocol. The switching part (109C) switches a communication part for performing the communication with the controller (CT) between the first communication part (109A) and the second communication part (209B) based on a switching signal described later acquired from the speed setting part 111 described later.

The parameter setting part 212 of the controller (CT) sets parameters (hereinafter also referred to as "speed parameters") including the second speed higher than the first speed set as the present encoder-side communication speed in response to a manipulation performed by a user. The parameter setting part 212 outputs parameter data showing set speed parameters to a first command transmission part (210A) described later which is included in the communication control part 210.

As described above, in this embodiment where an encoder-side communication speed can be set at two speeds, that is, a speed (V1) and a speed (V2), it is sufficient for the parameter setting part 212 to set a speed parameter indicating the speed (V2) as a second speed while assuming a first speed as the speed (V1). The speed parameter which the parameter setting part 212 sets is not limited to the parameter including the second speed (V2), and may be any parameter provided that the parameter includes a speed higher than the first speed. However, when the parameter setting part 212 sets a speed parameter indicating a speed other than the speed (V2) as the second speed, an encoder-side communication speed cannot be set at the speed and hence, the encoder-side communication speed is not changed to the speed and is maintained at the speed (V1).

The communication control part 210 of the controller (CT) controls the transmission and the reception of a signal between the controller (CT) and the encoder 100 through communication via the communication part 209. The communication control part 210 includes the first command transmission part (210A).

The first command transmission part (210A) transmits a change command for changing an encoder-side communication speed to a second speed to the encoder 100 at a first speed via the communication part 209. In this case, the first command transmission part (210A) outputs transmission time data indicating a transmission time of the change command to the higher-level speed setting part 211. The speed change command corresponds to one example of a first command signal. When the first command transmission part (210A) transmits a change command, a controller-side communication speed is initially set to a speed (V1). That is, the communication part is switched to the first communication part (209A). Accordingly, the first command transmission part (210A) transmits a change command at the speed (V1) via the first communication part (209A).

In this case, the first command transmission part (210A) acquires parameter data from the parameter setting part 212, and transmits a change command including a speed parameter expressed by the parameter data. The first command transmission part (210A) may transmit a change command including a speed parameter (fixed value) indicating a preset second speed or may transmit a change command which does not include a speed parameter. In this case, the above-mentioned parameter setting part 212 becomes unnecessary. However, for the sake of convenience of the description, hereinafter, the description is made with respect to the case where the first command transmission part (210A) transmits a change command including a speed parameter expressed by the above-mentioned parameter data.

In this embodiment, the first command transmission part (210A) repeatedly transmits a change command for a predetermined period (for example, for a period of 75 ms) at predetermined time intervals (for example, intervals of 25 ms) or less or a predetermined number of times (for example, three times). The first command transmission part (210A) may transmit a change command only one time or may transmit a change command repeatedly until a first response described later is received. However, for the sake of convenience of the description, hereinafter, the description is made with respect to a case where the first command transmission part (210A) repeatedly transmits a change command a predetermined number of times at predetermined time intervals or less.

FIG. 4A shows one example of data structure of a change command.

In the example shown in FIG. 4A, a change command contains sixteen data (D0 to D15). Data (D0) has the content expressing that data is a change command. Data (D1) is blanked. Data (D2) is a speed parameter. With respect to data (D3 to D15), although the description is omitted, each data is filled with certain content or is blanked.

Data structure of the change command shown in FIG. 4A is merely one example, and the change command may have data structure other than the above-mentioned data structure.

As shown in FIG. 2 and FIG. 3, the communication control part 110 of the encoder 100 controls the transmission and the reception of a signal between the encoder 100 and the controller (CT) through the communication via the communication part 109. The communication control part 110 includes a command response part (110A).

The command response part (110A) receives a signal transmitted from the controller (CT) via the communication part 109. In this case, the command response part (110A) outputs a signal indicating the reception of the signal from the controller (CT) (hereinafter, also referred to as a "signal receiving signal") to the determination part 113. Further, when the command response part (110A) receives the signal from the controller, the command response part (110A) transmits a response to the signal to the controller (CT) via the communication part 109.

That is, the command response part (110A) receives a change command transmitted from the controller (CT) via the communication part 109. In this case, the command response part (110A) outputs reception time data showing a reception time of the change command to the determination part 113. When the command response part (110A) receives the change command, an encoder-side communication speed is initially set to a speed (V1). That is, the communication part is switched to the first communication part (109A).

Accordingly, the command response part (110A) receives a change command via the first communication part (109A). Further, when the command response part (110A) receives a change command, the command response part (110A) transmits a response to the change command (hereinafter also referred to as "first response") to the controller (CT) at a speed (V1) via the first communication part (109A). In this case, the command response part (110A) outputs a signal indicating the transmission of the response (hereinafter referred to as "response transmission signal") to the determination part 113. A first response corresponds to one example of a first response signal.

In this case, when an encoder-side communication speed can be set to a second speed, that is, when a second speed is a speed (V2), the command response part (110A) transmits a first response including the fact that the second speed is the speed (V2). On the other hand, when an encoder-side communication speed cannot be set to a second speed, that is, the second speed is a speed other than a speed (V2), the command response part (110A) transmits a first response including the fact that the second speed is the speed other than the speed (V2). The command response part (110A) may transmit the first response only when the encoder-side communication speed can be set to the second speed. However, for the sake of convenience of the description, hereinafter, the description is made with respect to a case where when the command response part (110A) receives a change command, the command response part (110A) transmits a first response regardless of whether or not an encoder-side communication speed can be set to a second speed.

FIG. 4B shows one example of data structure of a first response.

In the example shown in FIG. 4B, the first response has the data structure where a status flag is allocated to data (D1) of a change command shown in FIG. 4A. The status flag indicates whether or not an encoder-side communication speed can be set to a second speed expressed in a speed parameter of data (D2). For example, when an encoder-side communication speed can be set to a second speed expressed in a speed parameter of data (D2), that is, when the second speed is a speed (V2), the status flag in data (D1) indicates that the encoder-side communication speed can be set to the second speed. On the other hand, when an encoder-side communication speed cannot be set to a second speed expressed in a speed parameter in data (D2), that is, when the second speed is a speed other than the speed (V2), the status flag of data (D1) indicates that the encoder-side communication speed cannot be set to the second speed.

Data structure of a first response shown in FIG. 4B is merely one example, and the first response may have data structure other than the above-mentioned data structure.

As shown in FIG. 2 and FIG. 3, when the determination part 113 of the encoder 100 acquires the above-mentioned reception time data from the command response part (110A), the determination part 113 detects a reception time of a change command based on the reception time data. Further, when the determination part 113 acquires the above-mentioned response transmission signal from the command response part (110A), the determination part 113 determines whether or not the above-mentioned signal reception signal can be acquired from the command response part (110A) before a first period (for example, 30 ms) elapses from a point of time that the detected change command is received. Then, the determination part 113 outputs a signal indicating a determination result (hereinafter also referred to as "determination signal") to a speed changing part (111A) described later of the speed setting part 111.

The speed setting part 111 of the encoder 100 changes an encoder-side communication speed by outputting a signal for switching a communication part for performing the communication between the encoder 100 and the controller (CT) (hereinafter also referred to as "switching signal") to the switching part (109C). The speed setting part 111 includes the speed changing part (111A).

The speed changing part (111A), when the command response part (110A) receives a change command, outputs a switching signal for switching a communication part for performing the communication between the encoder 100 and the controller (CT) to the second communication part (109B) to the switching part (109C) thus changing an encoder-side communication speed to a second speed, that is, to a speed (V2). Accordingly, in this embodiment where the controller (CT) transmits a change command containing a speed parameter, the speed changing part (111A) changes an encoder-side communication speed to a speed (V2) expressed by a speed parameter contained in the change command. When the controller (CT) transmits a change command which does not include a speed parameter, it is sufficient for the speed changing part (111A) to change an encoder-side communication speed to a preset speed (V2).

In this case, the speed changing part (111A) changes an encoder-side communication speed to a speed (V2) when the command response part (110A) transmits a first response expressing that the encoder-side communication speed can be set to a speed (V2) to the controller (CT). To be more specific, the speed changing part (111A) changes an encoder-side communication speed to a speed (V2) after at least a first period elapses from a point of time that the command response part (110A) receives a change command. To be still more specific, the speed changing part (111A) acquires a determination signal from the determination part 113, and changes or does not change an encoder-side communication speed to a speed (V2) based on a determination result of the determination part 113 expressed by the determination signal. That is, the speed changing part (111A) changes an encoder-side communication speed to a speed (V2) when a determination result from the determination part 113 indicates that the determination part 113 does not receive a signal reception signal from the command response part (110A) before the first period elapses. On the other hand, the speed changing part (111A) does not change an encoder-side communication speed to a speed (V2) and maintains the encoder-side communication speed at a speed (V1) when a determination result from the determination part 113 indicates that the determination part 113 receives a signal reception signal from the command response part (110A) before a first period elapses.

When the command response part (110A) receives a change command and an encoder-side communication speed can be set to a second speed, the speed changing part 111 may change the encoder-side communication speed to a second speed even when a first response is not transmitted to the controller (CT). In this case, it becomes unnecessary for the command response part (110A) to have a function of transmitting a first response to the controller (CT). However, for the sake of convenience of the description, hereinafter, the description is made with respect to a case where the speed changing part 111 changes an encoder-side communication speed to a second speed when the command response part (110A) receives a change command, the encoder-side communication speed can be set to the second speed, and the command response part (110A) transmits a first response to the controller (CT). Further, the speed changing part (111A) may change an encoder-side communication speed to a speed (V2) before a first period elapses (for example, immediately after the command response part (110A) receives a change command). However, for the sake of convenience of the description, hereinafter, the description is made with respect to a case where the speed changing part (111A) changes an encoder-side communication speed to a speed (V2) after at least a first period elapses. Further, the speed changing part (111A) may change an encoder-side communication speed to a speed (V2) after at least a first period elapses regardless of whether or not the command response part (110A) receives a signal from the controller (CT) before a first period elapses. In this case, the above-mentioned determination part 113 becomes unnecessary. However, for the sake of convenience of the description, hereinafter, the description is made with respect to a case where the speed changing part (111A) does not change an encoder-side communication speed to a speed (V2) when the command response part (110A) receives a signal from the controller (CT) before a first period elapses.

The communication control part 210 of the controller (CT) receives a first response transmitted from the encoder 100 via the communication part 209. In this case, the communication control part 210 outputs a signal indicating the reception of the first response (hereinafter also referred to as "response reception signal") to the communication stop part 214. When the communication control part 210 receives a first response, a controller-side communication speed is initially set to a speed (V1). That is, the communication part is switched to the first communication part (209A). Accordingly, the communication control part 210 receives a first response via the first communication part (209A).

When the communication stop part 214 of the controller (CT) acquires the above-mentioned response reception signal from the communication control part 210, the communication stop part 214 detects whether or not the fact that an encoder-side communication speed can be set to a second speed is included in a first response based on the response reception signal. There may be a case where the fact that the encoder-side communication speed can be set to the second speed is included in the first response. In this case, the communication stop part 214 outputs a signal for stopping the communication between the controller (CT) and the encoder 100 (hereinafter also referred to as "stop signal") to the communication control part 210 until a change of a controller-side communication speed is completed. Due to such outputting of the stop signal, the communication stop part 214 stops the communication between the controller (CT) and the encoder 100 by the communication part 209. The communication stop part 214 may stop only the transmission of a change command by the first command transmission part (210A) and may not stop the transmission and the reception of other signals by the communication part 209. However, for the sake of convenience of the description, hereinafter, the description is made with respect to a case where the communication stop part 214 stops all communications between the controller (CT) and the encoder 100 by the communication part 209. Further, when the communication between the controller (CT) and the encoder 100 by the communication part 209 is stopped, the communication stop part 214 outputs a signal expressing the stopping of the communication between the controller (CT) and the encoder 100 (hereinafter also referred to as "stop completion signal") to the higher-level speed setting part 211.

The higher-level speed setting part 211 of the controller (CT) changes a controller-side communication speed by outputting a signal for switching a communication part for performing the communication between the controller (CT) and the encoder 100 (hereinafter also referred to as "higher-level switching signal") to the switching part (209C).

That is, when the higher-level speed setting part 211 acquires the above-mentioned transmission time data from the first command transmission part (210A), the higher-level speed setting part 211 detects a transmission time of a change command based on the transmission time data. Further, the higher-level speed setting part 211, when the communication control part 210 receives a first response, changes a controller-side communication speed to a speed (V2) by outputting a higher-level switching signal for switching a communication part for performing the communication between the controller (CT) and the encoder 100 to the second communication part (209B) to the switching part (209C) after at least a second period (for example, 40 ms) longer than the above-mentioned first period elapses from a point of time that the detected change command is transmitted. To be more specific, the higher-level speed setting part 211 changes the controller-side communication speed to the speed (V2) after at least the second period elapses after the higher-level speed setting part 211 acquires a stop completion signal from the communication stop part 214. Then, when the controller-side communication speed is changed to the speed (V2), the higher-level speed setting part 211 outputs a signal indicating a change of the controller-side communication speed to the speed (V2) (hereinafter also referred to as "change completion signal") to a second command transmission part (210B) described later included in the communication control part 210.

The communication control part 210 of the controller (CT) includes the second command transmission part 210. The second command transmission part 210 acquires a change completion signal from the higher-level speed setting part 211 and, thereafter, transmits a confirmation command for confirming whether or not the speed setting part 111 of the encoder 100 changes an encoder-side communication speed to a speed (V2) to the encoder 100 at the speed (V2) via the second communication part (209A). The confirmation command corresponds to one example of the second command signal.

The command response part (110A) of the encoder 100 receives a confirmation command transmitted from the controller (CT) via the second communication part (109B). When the command response part (110A) receives a confirmation command, the command response part (110A) transmits a response to the confirmation command (hereinafter also referred to as "second response") to the controller (CT) at the speed (V2) via the second communication part (109B). The second response corresponds to one example of a first response signal. When the encoder-side communication speed is not set at the speed (V2), the command response part (110A) cannot receive the confirmation command, and a second response is not transmitted to the controller (CT) from the command response part (110A).

The communication control part (210A) of the controller (CT) receives a second response transmitted from the encoder 100 via the second communication part (209B). Accordingly, it is confirmed that an encoder-side communication speed is changed to a speed (V2), and the subsequent communication between the controller (CT) and the encoder 100 is performed at the speed (V2).

The above-mentioned series of processing relating to the transmission and the reception of a confirmation command and the transmission and the reception of a second response are not always necessary and may be omitted. In this case, it becomes unnecessary for the second command transmission part 210 and the command response part (110A) to have the above-mentioned function of receiving a confirmation command and the above-mentioned function of transmitting a second response, and it becomes unnecessary for the communication control part (210A) to have the above-mentioned function of receiving a second response. Here, for the sake of convenience of the description, hereinafter, the description is made with respect to a case where a series of processing relating to the above-mentioned transmission and reception of a confirmation command and the above-mentioned transmission and reception of a second response are performed.

The speed setting part 111 of the encoder 100 includes a speed initializing part 111B. The speed initializing part (111B) initializes an encoder-side communication speed to a speed (V1) by outputting a switching signal for switching a communication part for performing the communication between the encoder 100 and the controller (CT) to the first communication part (109A) to the switching part (109C) when the power source of the encoder 100 is interrupted.

In the controller (CT) and the encoder 100 shown in FIG. 2 and FIG. 3, the dividing of the functional configurations of the parts relating to the function of changing the communication speed is merely one example, and other dividing may be adopted.

Example Communication Between Controller and Encoder

Next, one example of the communication between the controller (CT) and the encoder 100 is described with reference to FIG. 5. In FIG. 5, the behavior of the communication between the controller (CT) and the encoder 100 is indicated by arrows which laterally connect the controller (CT) and the encoder 100 indicated by vertical lines respectively to each other. The direction of arrow indicates the direction of communication, and a side toward which the arrow is directed is a reception side. In the drawing, a time axis is taken downwardly, and FIG. 5 shows that the more downwardly the time axis extends, the more time elapses.

In the example shown in FIG. 5, firstly, at a point of time (t1), the first command transmission part (210A) of the controller (CT) transmits a change command to the encoder 100 at a speed (V1) via the first communication part (209A). Next, at a point of time (t2) after a predetermined interval of time elapses from the above-mentioned point of time (t1), the first command transmission part (210A) of the controller (CT) transmits a change command to the encoder 100 at a speed (V1) via the first communication part (209A). Then, at a point of time (t3) after a predetermined interval of time elapses from the above-mentioned time (t2), the first command transmission part (210A) of the controller (CT) transmits a change command to the encoder 100 at a speed (V1) via the first communication part (209A).

Then, at a point of time (t4), the command response part (110A) of the encoder 100 receives the change command transmitted from the controller (CT) at the above-mentioned point of time (t3) via the first communication part (109A). Thereafter, at a point of time (t5), the command response part (110A) of the encoder 100 transmits a first response to the change command which the command response part (110A) receives at the above-mentioned point of time (t4) at the speed (V1) via the first communication part (109A).

Then, at a point of time (t6), the communication control part 210 of the controller (CT) receives the first response transmitted from the encoder 100 at the above-mentioned point of time (t5) via the first communication part (209A). Thereafter, the communication stop part 214 of the controller (CT) stops the communication between the controller (CT) and the encoder 100.

When the first period elapses from the above-mentioned point of time (t4) and a point of time (t7) comes, the speed changing part (111A) of the encoder 100 changes the encoder-side communication speed to the speed (V2).

Then, when the second period elapses from the above-mentioned point of time (t3) and a point of time (t8) comes, the higher-level speed changing part 211 of the controller (CT) changes the controller-side communication speed to the speed (V2). Thereafter, at a point of time (t9), the second command transmission part (210B) of the controller (CT) transmits a confirmation command to the encoder 100 at the speed (V2) via the second communication part (209B).

Then, at a point of time (t10), the command response part (110A) of the encoder 100 receives the confirmation command transmitted from the controller (CT) at the above-mentioned point of time (t9) via the second communication part (109B). Thereafter, at a point of time (t11), the command response part (110A) of the encoder 100 transmits a second response to the confirmation command which the command response part (110A) receives at the above-mentioned point of time (t10) at a speed (V2) via the second communication part (109B).

Then, at a point of time (t12), the communication control part 210 of the controller (CT) receives the second response transmitted from the encoder 100 at the above-mentioned point of time (t11) via the second communication part (209B).

The communication between the controller (CT) and the encoder 100 shown in FIG. 5 is merely one example, and the communication between the controller (CT) and the encoder 100 is not limited to the above-mentioned flow shown in FIG. 5.

Example of Control Processes Performed by Controller and Encoder

Figure 6:
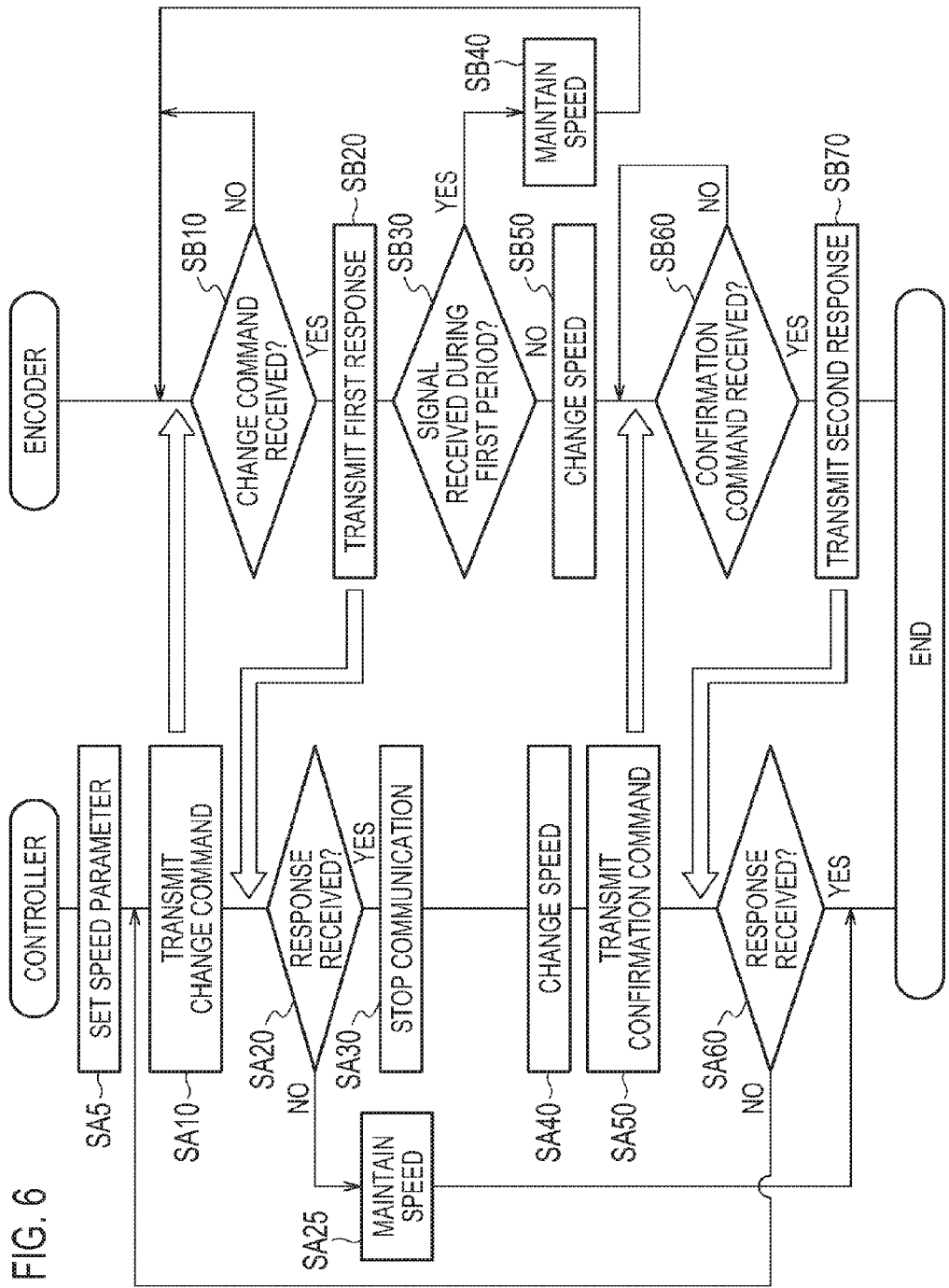
FIG. 6 is an explanatory view for describing one example of a control process performed between the controller and the encoder.

Next, the description is made with respect to one example of the processing for controlling the parts relating to a function of changing a communication speed performed between the controller (CT) and the encoder 100 with reference to FIG. 6. In FIG. 6, the illustration of the parts relating to the function of controlling the operation of the motor (M) of the controller (CT) and the parts relating to the function of generating position data of the encoder 100 and the like are omitted.

As shown in FIG. 6, in process (SA5), firstly, the parameter setting part 212 of the controller (CT) sets a speed parameter according to an operation of a user.

Thereafter, in process (SA10), the first command transmission part (210A) of the controller (CT) transmits a change command including a speed parameter set in the above-mentioned process (SA5) to the encoder 100 at a speed (V1) via the first communication part (209A). The processing in process (SA10) is repeatedly performed a predetermined number of times at predetermined time intervals or less.

In process (SB10), the command response part (110A) of the encoder 100 is in a standby state for receiving a change command transmitted from the controller (CT) in the above-mentioned process (SA10) via the first communication part (109A), and when the command response part (110A) receives the change command, the processing advances to process (SB20).

In process (SB20), the command response part (110A) of the encoder 100 transmits a first response to the change command which the command response part (110A) receives in the above-mentioned process (SB10) to the controller (CT) at a speed (V1) via the first communication part (109A). To be more specific, when an encoder-side communication speed can be set to a second speed expressed by a speed parameter included in a change command (when the second speed is the speed (V2)), the command response part (110A) transmits a first response including the fact that the second speed is the speed (V2), and the processing advances to process (SB30). On the other hand, when an encoder-side communication speed cannot be set to a second speed expressed by a speed parameter included in a change command (the second speed is a speed other than the speed (V2)), the command response part (110A) transmits a first response including the fact that the second speed is a speed other than the speed (V2), and the processing advances to the above-mentioned process (SB10). FIG. 6 shows that, in process (SB20), the command response part (110A) transmits a first response including the fact that an encoder-side communication speed can be set to a second speed expressed by a speed parameter included in a change command, and the processing advances to process (SB30).

In process (SB30), the determination part 113 of the encoder 100 determines whether or not the determination part 113 acquires the above-mentioned signal reception signal from the command response part (110A) before a first period elapses from a point of time that the determination part 113 receives a change command in the above-mentioned process (SB10). When the determination part 113 acquires the signal reception signal before the first period elapses, the processing advances to process (SB40).

In process (SB40), the speed changing part (111A) of the encoder 100 does not change an encoder-side communication speed to a speed (V2) and maintains the encoder-side communication speed at a speed (V1), and the processing advances to process (SB20).

On the other hand, when the determination part 113 does not acquire a signal reception signal before a first period elapses in the above-mentioned process (SB30), the processing advances to process (SB50).

In process (SB50), the speed changing part (111A) of the encoder 100 changes an encoder-side communication speed to a speed (V2).

In process (SA20), when the communication control part 210 of the controller (CT) does not receive a first response transmitted from the encoder 100 in the above-mentioned process (SB20) before a predetermined period elapses from a point of time that the communication control part 210 transmits a change command in process (SA10), the processing advances to process (SA25). Also when the communication control part 210 receives a first response which is transmitted from the encoder 100 in the above-mentioned process (SB20) and includes the fact that an encoder-side communication speed cannot be set to a second speed in process (SA20), the processing advances to process (SA25).

In process (SA25), the higher-level speed changing part 211 of the controller (CT) does not change a higher-level-device-side communication speed to a speed (V2) and maintains the higher-level-device-side communication speed at a speed (V1), and the processing expressed by a sequence of the controller (CT) is finished.

On the other hand, when the communication control part 210 receives a first response which is transmitted from the encoder 100 in the above-mentioned process (SB20) and includes the fact that an encoder-side communication speed can be set to a second speed in the above-mentioned process (SA20), the processing advances to process (SA30).

In process (SA30), the communication stop part 214 of the controller (CT) stops the communication between the controller (CT) and the encoder 100 by the communication part 209, and the processing advances to process (SA40).

In process (SA40), the higher-level speed setting part 211 of the controller (CT) changes a controller-side communication speed to a speed (V2) after at least the second period elapses from a point of time that the communication control part 210 transmits a change command in process (SA10), and the processing advances to process (SA50).

In process (SA50), the second command transmission part 210 of the controller (CT) transmits a confirmation command to the encoder 100 at a speed (V2) via the second communication part (209A).

In process (SB60), the command response part (110A) of the encoder 100 is in a standby state for receiving a confirmation command transmitted from the controller (CT) in the above-mentioned process (SA50) via the second communication part (109B). When the command response part (110A) receives the confirmation command, the processing advances to process (SB70).

In process (SB70), the command response part (110A) of the encoder 100 transmits a second response to a confirmation command which the command response part (110A) receives in process (SB60) to the controller (CT) at a speed (V2) via the second communication part (109B). Thereafter, the sequence on an encoder 100 side is finished.

In process (SA70), when the communication control part 210 of the controller (CT) does not receive a second response which is transmitted from the encoder 100 in the above-mentioned process (SB70) before a predetermined period elapses from a point of time that a confirmation command is transmitted in the above-mentioned process (SA50), the processing advances to the above-mentioned process (SA10). On the other hand, when the communication control part 210 receives the second response transmitted from the encoder 100 in the above-mentioned process (SB70), the sequence on a controller (CT) side is finished.

The control processing performed between the controller (CT) and the encoder 100 shown in FIG. 6 constitutes merely one example, and the control processing performed between the controller (CT) and the encoder 100 is not limited to the above-mentioned flow shown in FIG. 6.

Structural Example of Controller and Encoder

Various processing executed by the controller (CT) and the encoder 100 described above may be executed by one or dedicated hardware. However, the various processing may be executed by software. In executing various processing by software, these various processing can be realized by making the controller (CT) and the encoder 100 shown in FIG. 7 execute programs.

Hereinafter, the structural example of the controller (CT) and the encoder 100 which realize various processing by executing the program is described with reference to FIG. 7.

Figure 7:
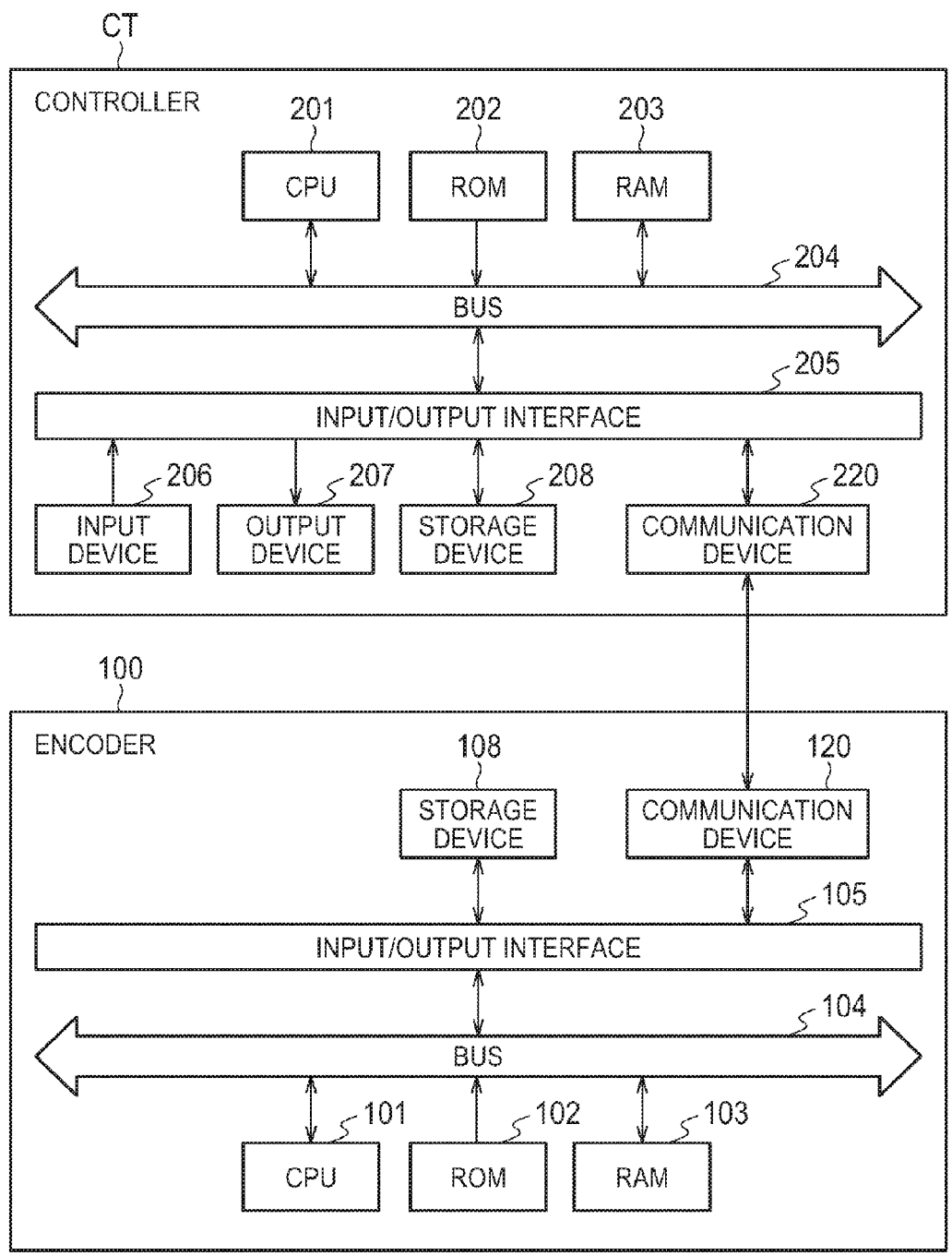
FIG. 7 is an explanatory view for describing a configurational example of the controller and the encoder.

As shown in FIG. 7, the controller (CT) includes, for example: a CPU 201; ROM 202; RAM 203; an input device 206 such as a mouse or a keyboard; an output device 207 such as a monitor; a storage device 208 such as an HDD; and a communication device 209. These structural parts are connected to each other such that signals can be transmitted between these structural parts through a bus 204 and an input/output interface 205.

The program can be recorded in the ROM 202, the storage device 208 or the like, for example.

When the CPU 201 executes the processing in accordance with a program recorded in the above-mentioned ROM 202, the storage device 208 or the like, various processing on a controller (CT) side can be realized. In this case, the CPU 201 may execute various processing by directly reading out the program from the ROM 202, the storage device 208 or the like, or may execute various processing after temporarily loading the program in the RAM 203, for example.

Further, the CPU 901 may perform various processing on a controller (CT) side based on signals and information inputted from the input device 206 when necessary.

The CPU 201 may also output a result acquired by executing various processing on a controller (CT) side from the output device 207, and may also record the result in the above-mentioned storage device 208 or the like.

On the other hand, the encoder 100 includes, for example, a CPU 101: ROM 102; RAM 103; a storage device 108 such as an HDD; and a communication device 109. These structural parts are connected to each other such that signals can be transmitted between these structural parts through a bus 104 and an input/output interface 105.

The program can be recorded in the ROM 102, the storage device 108 or the like, for example.

When the CPU 101 executes the processing in accordance with a program recorded in the above-mentioned ROM 102, storage device 108 or the like, various processing on an encoder 100 side can be realized. In this case, the CPU 101 may execute various processing by directly reading out the program from the ROM 102, the storage device 108 or the like, or may execute various processing after temporarily loading the program in the RAM 103, for example.

Example of Advantageous Effects

In the servo system S according to this embodiment described above, the first command transmission part (210A) of the controller (CT) transmits a change command for changing an encoder-side communication speed to a second speed higher than a present first speed to the encoder 100. When the encoder 100 receives the change command, the speed setting part 111 of the encoder 100 changes an encoder-side communication speed to a second speed. Accordingly, the controller (CT) can change an encoder-side communication speed to a desired speed. As a result, it becomes unnecessary to prepare the encoders 100 which respectively correspond to controller-side communication speeds and hence, the increase of the number of types of the encoders 100 can be prevented.

The controller (CT) changes an encoder-side communication speed and hence, the encoder-side communication speed can be selected on a user side. As a result, for example, when there is a demand for enhancement of control performance of the servo system (S) by shortening a communication delay time of the encoder 100 or the like, it becomes possible to select a high communication speed. On the other hand, for example, when a communication speed becomes high, a communication delay is generated because of a physical specification of a cable or the like thus giving rise to a possibility of an erroneous detection and hence, a low transmission speed can be selected when reliability of communication is emphasized.

As the configuration for switching an encoder-side communication speed, the configuration may be considered where the encoder 100 includes a determination part which automatically determines a controller-side communication speed based on a signal transmitted from the controller (CT). In this case, however, the encoder 100 is provided with the determination part or the like and hence, a hardware circuit becomes complicated leading to the increase of a cost. Also in this case, complicated arithmetic operation is performed where a clock signal contained in a signal from the controller (CT) is detected, a controller-side communication speed is determined, and a communication part is switched. Accordingly, there exists a drawback that a standby time before an encoder-side communication speed is switched becomes prolonged. To the contrary, in this embodiment, a hardware circuit such as a determination part becomes unnecessary and hence, the configuration can be simplified whereby the increase of a cost can be prevented. Further, the encoder 100 changes an encoder-side communication speed in response to a command from the controller (CT) and hence, the above-mentioned clock signal detection processing and determination processing of a controller-side communication speed become unnecessary whereby a standby time can be shortened.

Further, in this embodiment, the first command transmission part (210A) of the controller (CT) transmits a change command to the encoder 100 at a first speed to the encoder 100. In other words, in changing an encoder-side communication speed, the controller (CT) performs communication at a lower speed, and changes an encoder-side communication speed to a higher speed. Due to such a configuration, when a communication speed becomes a higher speed as described above, a communication delay is generated because of physical specification thus giving rise to a possibility of erroneous detection. Accordingly, for example, compare to a case where the controller (CT) performs communication at a higher speed and changes an encoder-side communication speed to a lower speed, the reliability of communication at the time of transmitting a change command can be enhanced.

Further, in this embodiment, particularly, when a change command is received, in the case where an encoder-side communication speed can be set at a second speed, the command response part (110A) of the encoder 100 transmits a first response to the controller (CT). Accordingly, for example, when the controller (CT) having a higher communication speed is put into a market as a new product, when a change command containing a speed parameter expressing the higher speed is transmitted to the encoder 100, the encoder 100 which can set the higher speed transmits a first response to the controller (CT) and hence, the controller (CT) can recognize the encoder 100. In this manner, even when a higher speed determination part is not newly provided to the encoder 100, the encoder 100 can correspond to communication between the controller (CT) and the encoder 100 thus acquiring an advantageous effect that downward compatibility can be easily maintained.

Further, in this embodiment, particularly, when the command response part (110A) transmits a first response to the controller (CT), the speed setting part 111 of the encoder 100 changes an encoder-side communication speed to a second speed after at least a first period elapses from reception of a change command. Accordingly, the communication between the encoder 100 and the controller (CT) can be executed at a first speed which is a speed before being changed to a second speed before the first period elapses and, thereafter, a change of a communication speed is executed. For example, when the controller (CT) acquires data of the encoder 100 and performs a predetermined setup operation, reliability and certainty are ensured by performing communication at a low speed (a first speed) and, after a lapse of the first period, when the controller (CT) controls an operation of a motor (M) based on a detection result of the encoder 100, the controller (CT) performs communication at a higher speed (second speed) thus enhancing control performance of the servo system (S).

Further, this embodiment can acquire the following advantageous effect particularly. That is, when the communication part 109 is executing certain processing (transmission/reception of a signal or the like) at the time of changing a communication speed, there is a possibility that switching of the communication part cannot be executed so that a communication speed cannot be normally changed. In view of the above, in this embodiment, the determination part 113 of the encoder 100 determines whether or not the command response part (110A) receives a signal from the controller (CT) before the first period elapses. Then, when the determination part 113 determines that the command response part (110A) has received a signal from the controller (CT), the speed setting part 111 does not change an encoder-side communication speed to a second speed. Accordingly, the execution of switching of the communication part is prohibited during a period where the communication part 109 is executing certain processing and hence, it is possible to suppress the occurrence of a state where a communication speed cannot be changed normally. On the other hand, when the determination part 113 determines that the command response part (110A) has not received a signal from the controller (CT), an encoder-side communication speed can be changed to a second speed by the speed setting part 111. Accordingly, a non-processing state of the communication part 109 is ensured before the first period elapses and, under such a condition, switching of the communication part can be executed and hence, reliability of a change in communication speed can be enhanced.

Further, in this embodiment, particularly, when a first response is received, the speed setting part 211 of the controller (CT) changes a controller-side communication speed to a second speed after a lapse of at least a second period which is longer than a first period from a point of time that the first command transmission part (210A) transmits a first change command. Accordingly, a non-processing state of the communication part 209 of the controller (CT) is ensured before the second period elapses and under such a condition, switching of the communication part can be executed and hence, reliability of a change in communication speed can be enhanced. Further, by setting the second period ranging from a point of time that a change command is transmitted to a point of time that a communication speed is changed longer than the first period, a time necessary for a change in communication speed on an encoder 100 side can be ensured thus enhancing reliability of a change in communication speed.

Further, in this embodiment, particularly, the higher-level speed setting part 211 of the controller (CT) changes a controller side communication speed to a second speed and, thereafter, the second command transmission part (210B) transmits a confirmation command for confirming whether or not the speed setting part 111 of the encoder 100 has changed an encoder-side communication speed to a second speed to the encoder 100. After receiving a confirmation command, when the encoder-side communication speed is set to the second speed, the command response part (110A) of the encoder 100 transmits a second response to the controller (CT). Accordingly, it is possible to confirm whether or not an encoder-side communication speed is surely changed before starting communication at a second speed between the controller (CT) and the encoder 100 and hence, reliability of communication can be further enhanced.

Further, in this embodiment, particularly, the parameter setting part 212 of the controller (CT) sets speed parameter containing a desired second speed. Then, the speed setting part 211 of the encoder 100 changes an encoder side communication speed to a second speed expressed by a speed parameter contained in a change command. Accordingly, a user can easily perform a change or addition of the second speed thus enhancing general-use property of a change command.

Further, in this embodiment, particularly, the speed setting part 111 of the encoder 100 includes a speed initializing part (111B) for initializing an encoder-side communication speed to a first speed when a power source of the encoder 100 is interrupted. The controller (CT) firstly performs communication with the encoder 100 at a first speed and hence, even when communication cannot be performed between the controller (CT) and the encoder 100 (because of difference in communication speed) due to the above-mentioned configuration, the communication between the encoder 100 and the controller (CT) can be restored by interrupting a power source of the encoder 100.

Modifications

One embodiment has been described in detail with reference to attached drawings heretofore. However, the scope of the technical concept described in claims is not limited to the embodiment described in this specification. It is evident that those who are skilled in the art in the technical field to which the embodiment of this disclosure pertains can arrive at various changes, modifications, combinations and the like within the scope of the technical concept of this disclosure. Accordingly, it is a matter of course that techniques which are made after these changes, modifications, combinations and the like are made also belong to the scope of the technical concept of this disclosure. Hereinafter, such modifications and the like are described sequentially.

In the above-mentioned embodiment, the description has been made with respect to the case where the controller (CT) transmits a change command for changing an encoder-side communication speed to a second speed higher than a present first speed to the encoder 100 at the first speed so that when the encoder 100 receives the change command, the encoder changes the encoder-side communication speed to the second speed. However, the embodiment of this disclosure is not limited to such content. For example, a case may be also considered where the controller (CT) transmits a change command for changing an encoder-side communication speed to a speed lower than a present speed to the encoder 100 at the present speed, and the encoder 100 changes the encoder-side communication speed to the slow speed when the encoder 100 receives the change command.

The embodiment of this disclosure is not limited to the case where a communication speed between the controller (CT) and the encoder 100 is changed, the embodiment is also applicable to a case where a transmission code of communication between the controller (CT) and the encoder 100 is changed. As the transmission code, transmission codes in various directions such as an RZ signal, an NRZ signal, an NRZI signal, an AMI signal, a CMI signal, a Manchester signal are named.

That is, as a type of transmission code for communication between the controller (CT) and the encoder 100, one type of transmission code is initially set. Then, for example, when it is necessary to change a type of transmission code due to the restriction imposed on parts forming a physical layer or the like, the controller (CT) transmits a command signal (hereinafter referred to as "third command signal") which changes a type of transmission code for communication to a transmission code (hereinafter referred to as "second transmission code") which differs from a present transmission code (hereinafter referred to as "first transmission code") to the encoder 100 using the first transmission code. Then, when the encoder 100 receives the third command signal, a type of transmission code for communication is changed to the second transmission code. Accordingly, the controller (CT) can change a type of transmission code on an encoder 100 side to a desired transmission code. As a result, it becomes unnecessary to prepare the encoders 100 which respectively correspond to types of transmission codes on a controller side and hence, the increase of the number of types of the encoders 100 can be prevented. Further, the controller (CT) changes types of transmission codes on an encoder 100 side and hence, a type of transmission code can be selected on a user side.

In the case where a type of a transmission code can be set to a second transmission code when the encoder 100 receives a third command signal, the encoder 100 transmits a response signal (hereinafter, also referred to as "third response signal") to the controller. When the encoder 100 transmits the third response signal to the controller (CT), a type of transmission code on an encoder 100 side may be changed to a second transmission code.

In this case, when the encoder 100 transmits the third response signal to the controller (CT), after at least a predetermined time (hereinafter, also referred to as "third period") has elapsed from the reception of the third command signal, a type of transmission code on an encoder 100 side may be changed to a second transmission code.

In this case, the encoder 100 determines whether or not the encoder 100 receives a signal from the controller (CT) before the third period elapses. When the encoder 100 receives a signal from the controller (CT) before the third period elapses, a type of a transmission code on an encoder 100 side may not be changed to a second transmission code.

In this case, when the controller (CT) receives the third response signal, after at least a predetermined time (hereinafter, also referred to as "fourth period") which is longer than the third period has elapsed from the transmission of the third command signal, a type of transmission code on an encoder 100 side may be changed to a second transmission code.

In this case, the controller (CT) may, after changing a type of transmission code on a controller (CT) side to a second transmission code, transmit a command signal (hereinafter, also referred to as "fourth command signal") for confirming whether or not the encoder 100 changes a type of transmission code on an encoder 100 side to a second transmission code to the encoder 100. In the case where a type of transmission code on an encoder 100 side is set to a second transmission code when the encoder 100 receives the fourth response signal, a response signal (hereinafter, also referred to as "fourth response signal") may be transmitted to the controller (CT).

In this case, the controller (CT) sets parameters containing a second transmission code, and the encoder 100 may change a type of transmission code on an encoder 100 side to a second transmission code expressed in the parameters contained in the third command signal.

In this case, when a power source for the encoder 100 is interrupted, the encoder 100 may initialize a type of transmission code on an encoder 100 side to the first transmission code.

The embodiment of this disclosure is also applicable to a case where both a communication speed between the controller (CT) and the encoder 100 and a transmission code for communication between the controller (CT) and the encoder 100 are changed.

Arrows shown in FIG. 1 to FIG. 3 indicate one example of the flow of signals, and are not provided for limiting the flow directions of the signals.

The sequence shown in FIG. 6 is not limited to processes illustrating the content of the embodiment, and the addition of processes, the deletion of processes and a change in order of processes and the like may be performed without departing from the gist and the technical concept of this disclosure.

In a servo system, communication is performed between a controller and an encoder. However, when a communication speed of the encoder does not correspond to the controller, such communication cannot be performed. Accordingly, encoders are provided respectively to correspond to communication speeds of the controller thus giving rise to a drawback that the number of types of encoders is increased.

A servo system according to an embodiment of the present invention and an encoder according to an embodiment of the present invention can prevent the increase of types of encoders.

According to one aspect of the present invention, a servo system includes a motor having a movable element which moves relative to a stator, an encoder which detects at least one of a position and a speed of the movable element, and a higher-level device which controls an operation of the motor based on a detection result of the encoder. The higher-level device includes a first command transmitter which transmits a first command signal for changing a communication speed between the encoder and the higher-level device to a second speed higher than a present first speed to the encoder at the first speed, and the encoder includes a speed set-upper which changes the communication speed between the encoder and the higher-level device to the second speed when the first command signal is received.

Another aspect of the present invention is an encoder for the servo system.

According to an embodiment of the present invention, the increase of the number of types of encoders can be prevented.

Obviously, numerous modifications and variations of the present invention are possible in light of the above teachings. It is therefore to be understood that within the scope of the appended claims, the invention may be practiced otherwise than as specifically described herein.

The invention claimed is:

1. A servo system, comprising:
   a motor comprising a stator and a movable element configured to move relative to the stator;
   an encoder configured to detect at least one of a position and a speed of the movable element of the motor; and
   a controller comprising first circuitry configured to control operation of the motor based on a detection result of the encoder,
   wherein the first circuitry of the controller is configured to transmit a first command signal that changes a communication speed between the encoder and the controller from a first speed to a second speed which is higher than the first speed, and the encoder comprises second circuitry configured to change the communication speed between the encoder and the controller to the second speed when the first command signal is received from the controller, and
   wherein the second circuitry of the encoder is configured to determine whether the encoder receives a signal from the controller before a first period elapses, and not to change the communication speed between the encoder and the controller to the second speed when the circuitry of the encoder determines that the encoder receives a signal from the controller.

2. The servo system according to claim 1, wherein the second circuitry of the encoder is configured to transmit a first response signal to the controller when the first command signal is received and when the communication speed between the encoder and the controller is available to be set to the second speed, and to change the communication speed between the encoder and the controller to the second speed when the encoder transmits the first response signal to the controller.

3. The servo system according to claim 2, wherein the second circuitry of the encoder is configured to change the communication speed between the encoder and the controller to the second speed after at least the first period elapses from reception of the first command signal when the encoder transmits the first response signal to the controller.

4. The servo system according to claim 3, wherein the first circuitry of the controller is configured to set a plurality of parameters including the second speed, and the second circuitry of the encoder is configured to change the communication speed between the encoder and the controller to the second speed of the parameters included in the first command signal.

5. The servo system according to claim 2, wherein the first circuitry of the controller is configured to set a plurality of parameters including the second speed, and the second circuitry of the encoder is configured to change the communication speed between the encoder and the controller to the second speed of the parameters included in the first command signal.

6. The servo system according to claim 1, wherein the first circuitry of the controller is configured to change the communication speed between the controller and the encoder to the second speed after at least a second period which is longer than the first period elapses from a point of time at which the controller transmits the first command signal when the first response signal is received.

7. The servo system according to claim 6, wherein the first circuitry of the controller is configured to transmit a second command signal that confirms whether the encoder has changed the communication speed between the encoder and the controller to the second speed after the controller changes the communication speed between the controller and the encoder to the second speed, and the second circuitry of the encoder is configured to transmit a second response signal to the controller when the communication speed between the encoder and the controller is set to the second speed when the second command signal is changed.

8. The servo system according to claim 1, wherein the first circuitry of the controller is configured to set a plurality of parameters including the second speed, and the second circuitry of the encoder is configured to change the communication speed between the encoder and the controller to the second speed of the parameters included in the first command signal.

9. The servo system according to claim 1, wherein the second circuitry of the encoder is configured to initialize the communication speed between the encoder and the controller to the first speed when a power source of the encoder is interrupted.

10. An encoder device for a servo system, comprising:
first circuitry configured to change a communication speed from a first speed to a second speed between the first circuitry and a controller which controls operation of a motor based on a detection result of the first circuitry, when a first command signal is received from the controller,
wherein the controller comprises second circuitry configured to transmit the first command signal that changes the communication speed between the first circuitry and the controller from the first speed to the second speed which is higher than the first speed, and wherein the first circuitry is configured to determine whether the circuitry receives a signal from the controller before a first period elapses, and not to change the communication speed between the first circuitry and the controller to the second speed when the first circuitry determines that the first circuitry receives the signal from the controller.

11. The encoder according to claim 10, wherein the first circuitry is configured to transmit a first response signal to the controller when the first command signal is received and when the communication speed between the first circuitry and the controller is available to be set to the second speed, and to change the communication speed between the first circuitry and the controller to the second speed when the first circuitry transmits the first response signal to the controller.

12. The encoder according to claim 11, wherein the first circuitry is configured to change the communication speed between the first circuitry and the controller to the second speed after at least the first period elapses from reception of the first command signal when the first circuitry transmits the first response signal to the controller.

13. The encoder according to claim 12, wherein the second circuitry of the controller is configured to set a plurality of parameters including the second speed, and the first circuitry is configured to change the communication speed between the first circuitry and the controller to the second speed of the parameters included in the first command signal.

14. The encoder according to claim 11, wherein the second circuitry of the controller is configured to set a plurality of parameters including the second speed, and the first circuitry is configured to change the communication speed between the first circuitry and the controller to the second speed of the parameters included in the first command signal.

15. The encoder according to claim 10, wherein the second circuitry of the controller is configured to change the communication speed between the controller and the first circuitry to the second speed after at least a second period which is longer than the first period elapses from a point of time at which the controller transmits the first command signal when the first response signal is received.

16. The encoder according to claim 15, wherein the second circuitry of the controller is configured to transmit a second command signal that confirms whether the first circuitry has changed the communication speed between the first circuitry and the controller to the second speed after the controller changes the communication speed between the controller and the first circuitry to the second speed, and the first circuitry is configured to transmit a second response signal to the controller when the communication speed between the first circuitry and the controller is set to the second speed when the second command signal is changed.

17. The encoder according to claim 10, wherein the second circuitry of the controller is configured to set a plurality of parameters including the second speed, and the first circuitry is configured to change the communication speed between the first circuitry and the controller to the second speed of the parameters included in the first command signal.

18. The encoder according to claim 10, wherein the first circuitry is configured to initialize the communication speed between the first circuitry and the controller to the first speed when a power source of the encoder is interrupted.

* * * * *